United States Patent [19]

Brinkmann et al.

[11] 4,456,718
[45] Jun. 26, 1984

[54] ELASTIC SYNTHETIC-RESIN COMPOSITIONS WITH IMPROVED ADHESION CONTAINING A SILANE

[75] Inventors: Bernd Brinkmann, Nordkirchen; Hermann-Josef Lucas, Ascheberg-Herbern, both of Fed. Rep. of Germany

[73] Assignee: Schering Aktiengesellschaft, Berlin and Bergkamen, Fed. Rep. of Germany

[21] Appl. No.: 463,704

[22] Filed: Feb. 4, 1983

[30] Foreign Application Priority Data

Feb. 4, 1982 [DE] Fed. Rep. of Germany ....... 3203687

[51] Int. Cl.$^3$ .............................................. C08L 75/04
[52] U.S. Cl. ..................... 524/114; 524/188; 524/262; 525/403; 525/457; 525/458
[58] Field of Search .................. 524/114, 188, 262; 525/403, 457, 458

[56] References Cited

U.S. PATENT DOCUMENTS

| | | | |
|---|---|---|---|
| 3,632,557 | 1/1972 | Brode et al. | 528/28 |
| 3,779,794 | 12/1973 | DeSantis | 428/422.8 |
| 4,222,925 | 9/1980 | Bryant et al. | 524/589 |
| 4,345,053 | 8/1982 | Rizk et al. | 525/440 |

FOREIGN PATENT DOCUMENTS 1545080 8/1969 Fed. Rep. of Germany .

*Primary Examiner*—Maurice J. Welsh
*Attorney, Agent, or Firm*—Millen & White

[57] ABSTRACT

Elastic synthetic-resin compositions useful as adhesive and sealing compounds, for example, for absorbent and nonabsorbent undercoats on surfaces, are based, in particular, on polyurethane and have incorporated therein as adhesion promoters silanes containing polyoxyalkyl groups of the formula

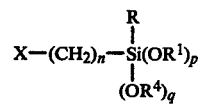

wherein
X is —SH, —NHR$^2$,

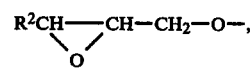

or —(NH—CH$_2$—CH$_2$)$_b$ NHR$^2$,
b is 1 or 2,
R is —CH$_3$, —CH$_2$—CH$_3$ or —OR$^1$,
R$^1$ is —(CH$_2$—CH$_2$—O)$_m$—R$^3$,
R$^2$ is H, an aliphatic, cycloaliphatic or aromatic hydrocarbon group each of 1 to 10 carbon atoms, or such a group which is substituted
R$^3$ is alkyl of 1 to 10 carbon atoms, or substituted alkyl of 1–10 carbon atoms,
R$^4$ is alkyl of 1 to 4 carbon atoms,
n is a number from 1 to 8,
m is a number from 1 to 30,
p is ≧ 1, and
q+p is ≦ 2.

The synthetic-resin compounds of this invention have improved adhesion to diverse substrates even without the use of adhesion-promoting coatings. This adhesion is sufficient for practical purposes and can be secured within relatively short times.

16 Claims, No Drawings

ELASTIC SYNTHETIC-RESIN COMPOSITIONS WITH IMPROVED ADHESION CONTAINING A SILANE

BACKGROUND OF THE INVENTION

Elastic synthetic-resin compounds for use as adhesive and sealing compounds for absorbent and non-absorbent undercoats or surfaces have gained increasing importance in recent years, especially in the building sector. While Thiokol sealants have predominated in the past, silicone and polyurethane sealing compounds have been coming into wider use of late.

Elastic sealing compounds are used especially to seal the joints of prefabricated structural elements and exposed concrete surfaces and, in addition to their sealing function, must compensate for considerable temperature-dependent movements. This expansion and contraction can impose severe stresses on the adhesion surface. Such sealants are also being used as caulking compounds on windows, between the window frame and the glass pane and between the masonry and the window frame, as well as in the installation of sanitary fixtures.

In these applications, too, the adhesive capacity of the sealing compounds has to meet stringent requirements.

Good adhesion is usually achieved by priming the substrates to be bonded or the surfaces to be sealed with a special coating which bonds to both the substrate and the sealant and thus is able to exert adhesion-promoting action.

The purpose of such primers is to provide the adhesion between substrate and sealant which otherwise would be lacking or inadequate.

While such primers are absolutely essential to successful application of sealing compounds, many users feel that using them is expensive and troublesome.

Improved adhesion of sealing compounds and greater handling ease are possible when special additives known as adhesion promoters are used. These generally are special organosilicon compounds which contain, in addition to a group that is reactive with respect to the polymer, two or three alkoxy groups which are attached to the silicon atom, for example:

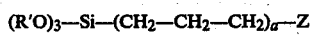

wherein
R'O is an alkoxy (e.g., methoxy or ethoxy) group,
Z is a functional organic group, and
a is one.

It is generally believed that the adhesion-promoting effect is due to a reaction of the additives with both the polymer and the substrate. The reaction with the substrate, for example, glass, occurs through hydrolysis of the Si—OR' bonds and condensation of the Si—OH group of the adhesion promoter with a Si—OH group of the glass surface, for example. In addition, however, there are also physical interactions between the adhesion promoter and the surface. The reaction with the polymer occurs through the reaction of the functional organic group Z with the reactive group of the polymer. (See DEFAZET, Deutsche Farben-Zeitschrift, reprint from No. 5, pp. 207–211.)

These adhesion-promoting additives are preferable to the use of adhesion-promoting coatings since they substantially reduce the work that has to be done on the construction site.

Frequently, however, the effect of these adhesion-promoting additives still falls short of meeting practical requirements, especially in the case of silicone an polyurethane sealing compounds. With polyurethane sealants, for example, it has not been possible heretofore to dispense with the use of adhesion-promoting coatings because the usual additives have not proved fully satisfactory.

SUMMARY OF THE INVENTION

Accordingly, it is an object of the present invention to provide elastic synthetic-resin compounds which exhibit improved adhesion to substrates even without the use of adhesion-promoting pre-coatings.

It is a further object to provide such compounds which exhibit an adhesion which is sufficient for practical purposes and is secured in some cases in a relatively short time, for example, within 24 to 48 hours.

Upon further study of the specification and appended claims, further objects and advantages of this invention will become apparent to those skilled in the art.

In accordance with this invention, these objects have been accomplished by adding to synthetic-resin compounds based preferably on polyurethanes, novel silanes containing oxyalkyl groups in place of the known trialkoxysilanes.

The present invention thus relates to elastic synthetic-resin compounds based on polyurethanes and containing adhesion promoters based on silanes containing oxyalkyl groups, wherein the adhesion promoters are silanes of Formula (I)

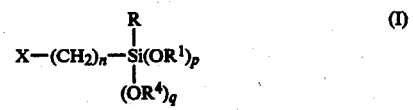

wherein
X is —SH, —NHR$^2$,

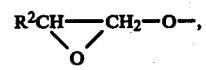

or —(NH—CH$_2$—CH$_2$)$_b$NHR$^2$,
b is 1 or 2,
R is —CH$_3$, —CH$_2$—CH$_3$, or —OR$^1$,
R$^1$ is —(CH$_2$—CH$_2$—O)—$_m$R$^3$,
R$^2$ is H or an optionally substituted, aliphatic and/or cycloaliphatic or aromatic, hydrocarbon group of from 1 to 10 carbon atoms,
R$^3$ is an optionally substituted alkyl group of from 1 to 10 carbon atoms,
R$^4$ is an alkyl group of from 1 to 4 carbon atoms,
n is a number from 1 to 8,
m is a number from 1 to 30, and more particularly from 1 to 15, and preferably from 1 to 5,
p is $\geq 1$, and
q+p is $\leq 2$.

These silanes are advantageous, inter alia, because of more rapid hydrolysis due to the oxyalkyl groups present therein.

In another aspect, the present invention provides adducts of compounds of Formula I with monomeric and/or prepolymeric compounds containing NCO groups. These are used as silanes, said adducts containing at least one NCO group.

In still another aspect, this invention relates to the use of these elastic synthetic-resin compounds as adhesive, sealing, encapsulating and casting compounds, wood fillers, coatings, etc.

DETAILED DISCUSSION

All of the adhesion promoters of this invention may be obtained from trimethoxysilanes, for example, through a transesterification reaction, as described, for example, in German patent application DOS No. 15 45 080, whose entire disclosure is incorporated by reference herein. All of the starting materials required for preparation of the silane at Formula I using this method are known or conventionally preparable including trimethoxysilanes with all variations of X and including all necessary ethers (hydroxy esters) required to obtain the full variation of OR' groups.

In a preferred embodiment of the present invention, the adhesion promoters of this invention are added through their functional group X to other reactive components. Any such components which will enter into an addition reaction with the group X, and in particular NCO-containing compounds, may be used as reactive components. Preferred are aliphatic, cycloaliphatic or aromatic di- or polyisocyanates which preferably contain different reactive NCO groups, as, for example, isophorone diisocyanate, or prepolymeric di- or polyisocyanates as prepared by known methods from isocyanates and polyether polyols or polyester polyols.

The molar ratio between the silanes of this invention and the reactive components is preferably such that at least one functional group of the reactive component is preserved, for example, a molar ratio of 1:2, based on the one reactive group X of the silane and the two reactive groups of a difunctional isocyanate. When the reactive component comprises k reactive groups (e.g., NCO groups) (with $k \geq 2$), the molar ratio may range from 1:k to (k−1):k. The adhesion promoters of this invention are suited for use especially with one-component polyurethane sealing compounds.

The optimum proportion of the silane compounds used in free or adduct form is somewhat dependent on the kind of compound used and on its molecular weight and can readily be determined by routine preliminary experiments. In general, amounts of these compounds from 1 to 10 weight percent, and more particularly from 2 to 8 weight percent, based on the total weight of the formulation, i.e., including all conventional additives as discussed herein, have proved sufficient. Generally, amounts of the polyurethane in the overall formulations are 70–80% and more particularly from 10–40% based on the weight.

Suitable polyurethane sealing compounds included the many commercial systems which are used in one- or two-component form and are described, for example, in German patent applications DOS Nos. 21 16 882, 25 21 841, 26 51 479 and 27 18 393, all of whose disclosures are incorporated by reference herein.

These include products of the reaction of polyols with excess diisocyanates which optionally may be masked. These are generally formulated with conventional fillers, plasticizers, pigments and thixotropic agents. Diamines or polyols are generally used as curing agents with two-component sealing compounds while one-component sealants may contain latent moisture-sensitive curing agents, e.g., diene amines, bis-ketimines or bis-oxazolidines which permit accelerated reaction with the moisture in the air.

The commonly used polyols include polyether polyols obtained by anionic polymerization, copolymerization or bulk copolymerization of alkylene oxides, e.g., ethylene oxide, propylene oxide and butylene oxide with bis- or polyfunctional alcohols, e.g., 1,4-butanediol, 1,1,1-trimethylolethane, 1,1,1-trimethylolpropane, 1,2,6-hexanetriol, glycerol, pentaerythritol and sorbitol, or with amines, e.g., methylamine, ethylenediamine and 1,6-hexamethylenediamine, as starting components, or by cationic polymerization and copolymerization of cyclic ethers, e.g., tetrahydrofuran, ethylene oxide and propylene oxide with acidic catalysts, e.g., boron trifluoride etherate, and by polycondensation of glycols which can be polycondensed with elimination of water, e.g., 1,6-hexanediol, in the presence of acidic etherification catalysts, e.g., para-toluenesulfonic acid, and, in view of a flame-retardant effect, for example, oxyalkylation products of phosphoric acid and phosphorous acid, for example, with ethylene oxide, propylene oxide, butylene oxide and styrene oxide. Suitable polythioether polyols include primarily the products of polycondensation of thiodiglycol with itself and with diols and/or polyols, e.g., 1,6-hexanediol, triethylene glycol, 2,2-dimethyl-1,3-propanediol and 1,1,1-trimethylolpropane, in the presence of acidic etherification catalysts, e.g., phosphoric acid and phosphorous acid. Suitable polyacetals are primarily the polycondensation products of formaldehyde and diols and/or polyols, e.g., diethylene glycol, triethylene glycol, 1,4-butanediol, 1,6-hexanediol, thioglycol and 1,1,1-trimethylolpropane, with acidic catalysts, e.g., phosphoric acid and para-toluenesulfonic acid. Suitable polyester polyols are primarily products of condensation with di- and/or polycarboxylic acids and di- and/or polyols which are prepared by polycondensation of adipic acid, phthalic acid, tetrahydrophthalic acid, hexahydrophthalic acid and ethylene glycol, 1,4-butanediol, diethylene glycol, triethylene glycol, 1,6-hexanediol and 2,2-dimethyl-1,2,6-propanediol, for example, as well as polycarbonates of said di- and polyols and polyester amides with the further use of amino alcohols such as alpha-caprolactone.

These polymerization and polycondensation products are converted conventionally with di- and/or polyisocyanates into so-called isocyanate prepolymers containing isocyanate groups. The latter can also be used for formation of the mentioned silane adducts. If a certain additional chain-lengthening reaction through urethane groups is desirable or can be tolerated, the polymerization or polycondensation products containing hydroxyl groups can be reacted with the di- or polyisocyanates, optionally first at from 0° to 25° C. and with cooling, and then for sevral hours with heating to preferably 50° to 120° C., in an NCO/OH ratio of from 1.5:1 to 2.5:1, and preferably of from 1.8:1 to 2.2:1. When a chain-lengthening reaction is not desired, a substantially larger excess of di- or polyisocyanate is used, preferably calculated for an NCO/OH ratio of from 3:1 to 5:1, the procedure being othewise the same as with lower NCO-/OH ratios, and the excess di- or polyisocyanate, if distillable, being removed by thin-layer distillation or, if not distillable, by solvent extraction.

Suitable di- or polyisocyanates include, for example, 2,4-toluylenediisocyanate, its technical mixtures with 2,6-toluylenediisocyanate, 2,6-toluylenediisocyanate, 4,4'-diphenylmethane diisocyanate, 1,6-hexamethylenediisocyanate, dimeric fatty acid diisocyanate, 1,5-naphthylenediisocyanate, meta-xylylenediisocyanate-1-methyl-2,4-diisocyanatocyclohexane, isophoronediisocyanate, 2,4,4-trimethyl-1,6-diisocyanatohexane, dimeric 2,4-toluylenediisocyanate, N,N'-di(4-methyl-3-isocyanatophenyl)urea, N,N'-N"-tri(6-isocyanatohexyl) biuret, 4,4',4" -triphenylmethanetriisocyanate, the reaction product of 3 moles of 2,4-toluylenediisocyanate and 1 mole of 1,1,1-trimethylolpropane, trimerization and polymerization products of 2,4-toluylenediisocyanate, cotrimerization and copolymerization products of 2,4-toluylenediisocyanate and 1,6-hexamethylenediisocyanate, mixtures of isomeric diphenylmethanediisocyanates, polyisocyanates containing more than two benzene rings linked through methane groups, or diisocyanates of a diphenylmethane structure whose isocyanate groups have been partially converted to carbodiimide groups. These are also useful for formation of the mentioned silane adduct.

The polymerization or polycondensation products carrying isocyanate groups and produced by known methods from said components may then be conventionally reacted with phenols substituted by $C_4$ to $C_{18}$ alkyl groups, preferably in stoichiometric amounts, to give phenyl carbamate esters. This reaction is advantageously carried out at elevated temperature, preferably at from 50° to 120° C., and optionally by the use of catalysts commonly employed in isocyanate chemistry, such as tertiary amines and/or compounds of di- and tetravalent tin.

The polymerization or polycondensation products carrying isocyanate groups may be produced in bulk or in solvents inert to isocyanates. On completion of the reaction, any solvents used are eliminated by distillation, and preferably by thin-layer distillation. However, it may be advantageous to make direct further use of the solutions of the isocyanate prepolymers.

Suitable solvents include, for example, esters, e.g., ethyl acetate, butyl acetate, methyl ethyl ketone or methyl isobutyl ketone, aromatic hydrocarbon compounds, e.g., toluene, xylene and mixtures of higher aromatics, as well as mixtures of said solvents.

In the production of the di- and polyfunctional polymerization or polycondensation products containing isocyanate groups, the chain-lengthening agents commonly used in reactions conducted by the isocyanate polyaddition method may also be used. Apart from the chain-lengthening reaction, the use of polyfunctional chain-lengthening agents makes it possible to bring about the branching, through urethane groups, of polymerization and polycondensation products which in themselves are merely difunctional. Since the urethane-group content is increased when chain-lengthening agents are used, the viscosity of the isocyanate prepolymers may optionally be increased as desired.

Chain-lengthening agents which are suitable for this purpose include primarily compounds containing hydroxyl groups, for example, 1,4-butanediol, 1,1,1-trimethylolpropane and hydroquinone di(2-hydroxyethyl ether).

Suitable catalysts, which may be used in amounts ranging from 0.001 to 2 percent, include diazabicyclooctane, dibutyltin dilaurate and stannous octoate.

Preferred curing agents for one-component mixtures containing isocyanate groups include, in particular, the enamines and compounds containing enamine and aldimine or ketimine groups described in German patent applications DOS Nos. 21 16 882, 25 21 841, 26 51 479 and 27 18 393, all of whose disclosures are incorporated by reference herein. Within two-component systems, the known curing agents commonly used in this field may be used.

Additives commonly used in this field, such as inert fillers, pigments, dyes, plasticizers, thickeners, thixotropic agents, solvents, and extenders such as tars, tar pitches and asphalts not reactive to isocyanate, or plastics such as polyolefins, vinyl plastics and polyamides, may also be used in the production of the synthetic-resin compounds. Preferred fillers include sands, mineral powder, calcium carbonate and, in particular, silicas which have been rendered hydrophobic. Preferred solvents are optionally substituted hydrocarbons or ketones. Generally, the total amount of such additives is 20°–90° wt. % of the overall compositions.

For acceleration of the cure, organic or inorganic acids may be added in small amounts as catalysts.

The synthetic-resin compounds of this invention are preferably used as elastic adhesive and sealing compounds for absorbent and nonabsorbent undercoating of surfaces, especially in the construction field.

Unless indicated otherwise herein, all details of the preparation and use of the urethane component/silane compounds of this invention are conventional and are described, e.g., in U.S. Pat. Nos. 3,632,552, 4,222,925 and 4,345,053 whose disclosures are incorporated by reference herein.

Typical aliphatic groups $R^2$ include $C_{1-10}$ alkyl groups such as methyl, ethyl, the propyls, the butyls, the hexyls, the decyls, etc. preferably methyl and ethyl.

Typical $C_{3-10}$-cycloaliphatic groups $R^2$ include cyclopropyl, cyclobutyl, cyclopentyl, cyclohexyl, cyclodecyl, etc. preferably cycloalkyl.

Typical $C_{6-10}$-aromatic groups include phenyl and 1- and 2-naphthyl, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

(A) Preparation of the silane compounds of this invention

Example A1

Transesterification of gamma-aminopropyltrimethoxysilane with diethylene glycol monomethyl ether To a columnar apparatus equipped with an internal thermometer, reflux condenser with calcium chloride tube, and stirrer, 412 g (2.3 moles) of gamma-aminopropyltrimethoxysilane was charged, and 1242 g (10.35 moles, or a 50% excess) of diethylene glycol monomethyl ether was then added with stirring. The reaction mixture was refluxed for 2 hours, the boiling temperature being about 110° C.

After cooling of the reaction mixture, the reflux condenser was replaced with a distillation bridge. The methyl alcohol liberated during the reaction was first distilled off at normal pressure, and then, after further cooling, unreacted diethylene glycol monomethyl ether was distilled off under a vacuum of about 10 millibars up to an internal temperature of 130° C.

979 g of a crude product was obtained which still contained about 13 wt. % of diethylene glycol monomethyl ether. The transesterification product was formed to the extent of about 75% of tris-2-(2-methoxyethoxy) ethoxysilyl-3-amino-propane of the formula $H_2N-CH_2-CH_2-CH_2Si-[O(-CH_2-CH_2-O)_2-CH_3]_3$, as confirmed by gas chromatography and mass spectrometry. The remainder consisted predominantly of the corresponding mono- and di-(2-[2-methoxyethoxy)silyl compounds.

Example A2

Transesterification of n-methyl-gamma-aminopropyltrimethoxysilane with diethylene glycol monomethyl ether 290 g (1.5 moles) of n-methyl-gamma-aminopropyltrimethoxysilane was transesterified with 810 g (6.75 moles, or a 50% excess) of diethylene glycol monomethyl ether as in Example 1. The reaction mixture was refluxed for 2 hours. The boiling temperature, which was 115° C. at the outset, dropped to 105° C. in the course of the reaction.

On completion of the reaction, the liberated alcohol and the glycol ether were distilled off up to a still temperature of 130° C. as in Example 1. The crude product, obtained in an amount of 658 g, consisted to the extent of about 67% of tris(2-[2-methoxyethoxy]ethoxy)silyl-3-(n-methyl)aminopropane of the formula $CH_3-NH-(CH_2)_3-Si-[O(-CH_2-CH_2-O)_2-CH_3]_3$, as confirmed by gas chromatography and mass spectrometry. The crude product further contained about 70 g of undistilled glycol ether and partially transesterified products.

Example A3

Transesterification of gamma-mercaptopropyltrimethoxysilane with diethylene glycol monomethyl ether 157 g (0.8 mole) of gamma-mercaptopropyltrimethoxysilane was transesterified with 432 g (3.6 moles, or a 50% excess) of diethylene glycol monomethyl ether as in Example 1. The reaction mixture was refluxed for 2 hours. The reaction was catalyzed with 1 g of ethyl titanate. The boiling temperature was 106° C.

The liberated methanol and the glycol ether were distilled off under the same conditions as in Example 1, except that the internal temperature was raised to 140° C. as the glycol ether was being distilled off. 353 g of a crude product was obtained which was formed to the extent of about 85 wt. % of tris-(2-[2-methoxyethoxy]ethoxy)silyl-3-mercaptopropane of the formula $HS-(CH_2)_3-Si-[O-(CH_2-CH_2-O)_2-CH_3]_3$, as confirmed by gas chromatography. The crude product further contained about 35 g of glycol ether.

Example 4A

Transesterification of gamma-glycidyloxypropyltrimethoxysilane with diethylene glycol monomethyl ether In the apparatus described in Example 1, 118 g (0.5 mol) of gamma-glycidyloxypropyltrimethoxysilane was stirred with 180 g (1.5 mole) of diethylene glycol monomethyl ether at 70° C. for 8 hours in the presence of 1 g of ethyl titanate as catalyst. After cooling to room temperature and replacement of the reflux condenser by a distillation bridge, the methyl alcohol liberated and the excess glycol ether were distilled off under a vacuum of 10 millibars. The internal temperature was raised to only 75° C. and maintained at that level for 1 hour. A crude product was obtained in a yield of 98 wt. %.

These technical products may also be used in distilled form.

The following silanes were also prepared in accordance with this procedure:

| Example | Transesterification product of |
|---|---|
| A5 | Gamma-aminopropyltrimethoxysilane and ethyl Cellusolve |
| A6 | Gamma-aminopropylmethyldiethoxysilane and methyl diglycol |
| A7 | Gamma-mercaptopropyltrimethoxysilane and ethyl glycol |
| A8 | Gamma-aminopropyltriethoxysilane and ethyl triglycol |
| A9 | Gamma-aminopropyltrimethoxysilane and ethyl triglycol |
| A10 | Gamma-aminopropyltrimethoxysilane and ethyl diglycol |
| A11 | Gamma-aminopropyltrimethoxysilane and methyl polyglycol |

(B) Preparation of isocyanate adducts from the silanes in accordance with this invention

Example B1

84.6 g of isophorone diisocyanate (IPDI) was charged under nitrogen into a round-bottom flask with a stirrer, and over a period of 3.5 hours, 150 g of the silane of Example A1 was added through a dropping funnel with stirring.

The reaction mixture was found to have an isocyanate content of 7.1%.

By the same procedure, the following isocyanate adducts were prepared (by reaction in a molar ratio of 1:1):

| Example | Silane used: As in Example (A) | Isocyanate used | Isocyanate content, % |
|---|---|---|---|
| B2 | 5 | Isophoronediisocyanate | 7.8 |
| B3 | 2 | Isophoronediisocyanate | 6.9 |
| B4 | 6 | Isophoronediisocyanate | 8.3 |
| B5 | 7 | Isophoronediisocyanate | 7.7 |
| B6 | 8 | Isophoronediisocyanate | 6.1 |
| B7 | 9 | Isophoronediisocyanate | 4.7 |
| B8 | 10 | Isophoronediisocyanate | 6.9 |
| B9 | 1 | Isophoronediisocyanate (1) | 1.45 |
| B10 | 1 | Isophoronediisocyanate (2) | 0.6 |

| Comparative Examples B | Silane used | Isocyanate used | Isocyanate content, % |
|---|---|---|---|
| 1 | γ-aminopropyltrimethoxy silane | Isophoronediisocyanate | 10.5 |
| 2 | γ-mercaptopropyltrimethoxy silane | Isophoronediisocyanate | 10.1 |

(1) Prepolymeric isocyanate, made from a difunctional polypropylene glycol (OH number 56) and IPDI in a ratio of 1:2.
(2) Prepolymeric isocyanate, made from a trifunctional polypropylene glycol (OH number 35.6) and IPDI in a ratio of 1:3.

(C) Preparation of polyurethane sealing compounds

Example C

The following components were weighed into the 8-liter kettle of a commercial planetary mixer provided with a vacuum port:
80 g of a linear isocyanate prepolymer based on polypropylene glycol and having aliphatic isocyanate groups (NCO content, 3.4%), 205 g of a branched-chain isocyanate prepolymer based on polypropylene glycol and having aliphatic isocyanate terminal groups (NCO content, 2.7%),
100 g highly disperse silicic acid,
550 g diisodecyl phthalate,
380 g chalk,
100 g Shell Sol T
20 g silane/isocyanate adduct according to Example (B) 1, and
120 g of a latent amine curing agent, amine value 82 (prepared in accordance with German Pat. No. 25 21 841).

These components were then kneaded for a total of 40 minutes. Degasification was effected in the end for 10 minutes under a vacuum of 20 mm Hg.

(D) Testing of sealing compounds

Example D1

Testing of adhesion to glass

A specimen in the form of a strand about 5 cm long was applied to a glass plate and kept there under normal climatic conditions.

Attempts were then made at one-day intervals to remove the strand by hand. Evaluation was based on either cohesion failure (C) or adhesion failure (A).

The following sealing compounds were tested by the same procedure:

| Sealing compound according to Example C with addition of the adhesion promoter of Example | Storage time under normal climatic conditions (days) | | | |
|---|---|---|---|---|
| | 1 | 5 | 10 | 18 |
| (A) 4 | C | C | C | C |
| (B) 1 | C | C | C | C |
| (B) 3 | C | C | C | C |
| (B) 5 | A | A | C | C |
| (B) 7 | C | C | C | C |
| Comparative Example | | | | |
| 1 | A | A | A | A |
| 2 | A | A | A | A |

(E) Testing of adhesion to concrete

Two concrete slabs made of cement mortar and measuring 50×15×25 mm were secured side by side, spaced 15 mm apart. The sealing compound incorporating the silane additive was then introduced free of bubbles into the space between them.

The surface was then smoothed and made level with the surface of the concrete slabs.

After 14-days storage under normal climatic conditions, a tensile test in conformity with DIN 52455 was performed. The tensile stress in Newtons per square centimeter at which adhesion failure occurs is a measure of the adhesive capacity of the sealing compound.

The following sealing compounds were tested by the same procedure:

| Sealing compound incorporating silane according to Example | Tensile stress at failure (N/cm²) | Type of failure* |
|---|---|---|
| (A) 4 | 64.0 | A |
| (B) 1 | 54.7 | A |
| (B) 2 | 76 | C |
| (B) 3 | 57 | A |
| (B) 4 | 52 | A |
| (B) 5 | 52.4 | A |
| (B) 6 | 53 | A |
| (B) 7 | 55.6 | A |
| (B) 8 | 52.9 | A |
| Comparative Examples | | |
| Sealing compound without silane additive | 0 | A |
| Sealing compound with gamma-mercaptopropyl-trimethoxysilane per Comparative Example B2 | 25 | A |

*A = Adhesion failure
*C = Cohesion failure

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An elastic synthetic-resin composition which is the product of the incorporation into a polyurethane of an adhesion promoter which is
(a) a silane of the formula

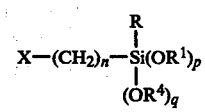

wherein
X is —SH, —NHR²,

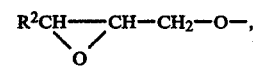

or —(NH—CH₂—CH₂)ᵦ NHR²,
b is 1 or 2,
R is —CH₃, —CH₂—CH₃ or —OR¹,
R¹ is —(CH₂—CH₂—O)ₘR³,
R² is H, an aliphatic, cycloaliphatic or aromatic hydrocarbon group each of 1 to 10 carbon atoms,
R³ is alkyl of 1 to 10 carbon atoms, or substituted alkyl of 1–10 carbon atoms,
R⁴ is alkyl of 1 to 4 carbon atoms,
n is a number from 1 to 8,
m is a number from 1 to 30,
p is ≧1, and
q+p is ≦2; or
(b) an adduct of such a silane with a monomeric or prepolymeric compound containing NCO groups, said adduct containing at least one NCO group.

2. A composition of claim 1 wherein the adhesion promoter is said silane.

3. A composition of claim 1 wherein the adhesion promoter is said adduct.

4. A composition of claim 1 wherein m is 1–5.

5. A composition of claim 3 wherein the monomeric or prepolymeric compound containing NCO groups is an aliphatic, cycloaliphatic or aromatic di- or polyisocyanate.

6. A composition of claim 1 wherein the monomeric or prepolymeric compound comprises 2,4-toluylenediisocyanate, its technical mixtures with 2,6-toluylenediisocyanate, 2,6-toluylenediisocyanate, 4,4'-diphenylmethane diisocyanate, 1,6-hexamethylenediisocyanate, dimeric fatty acid diisocyanate, 1,5-naphthylenediisocyanate, meta-xylyenediisocyanate-1-methyl-2,4-diisocyanatocyclohexane, isophoronediisocyanate, 2,4,4-trimethyl-1,6-diisocyanatohexane, dimeric 2,4-toluylenediisocyanate, N,N'-di(4-methyl-3-isocyanatophenyl)urea, N,N'-N''-tri(6-isocyanatohexyl)biuret, 4,4',4''-triphenylmethane-triisocyanate, the reaction product of 3 moles of 2,4-toluylenediisocyanate and 1 mole of 1,1,1-trimethylolpropane, trimerization and polymerization products of 2,4-toluylenediisocyanate, cotrimerization and copolymerization products of 2,4-toluylenediisocyanate and 1,6-hexamethylenediisocyanate, mixtures of isomeric diphenylmethanediisocyanates, polyisocyanates containing more than two benzene rings linked through methane groups, or diisocyanates of a diphenylmethane structure whose isocyanate groups have been partially converted to carbodiimide groups.

7. A composition of claim 3 wherein the molar ratio in the adduct of the silane component to the monomeric or prepolymeric component is 1:k to (k-1):k, wherein k is the number of NCO groups in the latter component and k is as defined in claim 3 but is $\geq 2$.

8. A composition of claim 1 wherein the amount of said adhesion promoter is 1–10 wt. % based on the total weight of adhesion promoter and polyurethane component.

9. An adduct of
(a) a silane of the formula

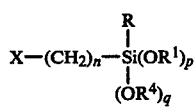

10 wherein
X is —SH, —NHR$^2$,

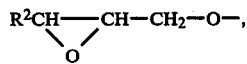

or —(NH—CH$_2$—CH$_2$)$_b$ NHR$^2$,
b is 1 or 2,
R is —CH$_3$, —CH$_2$—CH$_3$ or —OR$^1$,
R$^1$ is —(CH$_2$—CH$_2$—O)—R$^3$,

R$^2$ is H, an aliphatic, cycloaliphatic or aromatic hydrocarbon group each of 1 to 10 carbon atoms, or such a group which is substituted
R$^3$ is alkyl of 1 to 10 carbon atoms, or substituted alkyl of 1–10 carbon atoms,
R$^4$ is alkyl of 1 to 4 carbon atoms,
n is a number from 1 to 8,
m is a number from 1 to 30,
p is $\geq 1$, and
q+p is $\leq 2$; or
(b) a monomeric or prepolymeric compound containing NCO groups in a quantitative ratio such that at least one NCO group is contained in the adduct.

10. A composition of claim 9 wherein the monomeric or prepolymeric compound containing NCO groups is an aliphatic, cycloaliphatic or aromatic di- or polyisocyanate.

11. A composition of claim 9 wherein the monomeric or prepolymeric compound comprises 2,4-toluylenediisocyanate, its technical mixtures with 2,6-toluylenediisocyanate, 2,6-toluylenediisocyanate, 4,4'-diphenylmethane diisocyanate, 1,6-hexamethylenediisocyanate, dimeric fatty acid diisocyanate, 1,5-naphthylenediisocyanate, meta-xylyenediisocyanate-1-methyl-2,4-diisocyanatocyclohexane, isophoronediisocyanate, 2,4,4-trimethyl-1,6-diisocyanatohexane, dimeric 2,4-toluylenediisocyanate, N,N'-di(4-methyl-3-isocyanatophenyl)urea, N,N'-N''-tri(6-isocyanatohexyl)biuret, 4,4',4''-triphenylmethane-triisocyanate, the reaction product of 3 moles of 2,4-toluylenediisocyanate and 1 mole of 1,1,1-trimethylolpropane, trimerization and polymerization products of 2,4-toluylenediisocyanate, cotrimerization and copolymerization products of 2,4-toluylenediisocyanate and 1,6-hexamethylenediisocyanate, mixtures of isomeric diphenylmethanediisocyanates, polyisocyanates containing more than two benzene rings linked through methane groups, or diisocyanates of a diphenylmethane structure whose isocyanate groups have been partially converted to carbodiimide groups.

12. A composition of claim 9 wherein the molar ratio in the adduct of the silane component to the monomeric or prepolymeric component is 1:k to (k-1):k, wherein k is the number of NCO groups in the latter component and k is as defined in claim 9 but is $\geq 2$.

13. In an elastic composition comprising a polyurethane component and an adhesion promoter and conventional additives, the improvement wherein the combination of polyrethane component and the adhesion promoter comprises the compound of claim 1.

14. A composition of claim 13 which is an adhesive, sealing, encapsulating, casting, wood filling or coating composition.

15. In a method of adhering two surfaces together by applying an elastic composition therebetween or of sealing a surface by applying an elastic composition thereover, the improvement wherein the elastic composition is that of claim 13.

16. A method of claim 15 wherein the elastic composition is applied to the surface directly without an intermediate adhesion promoter.

* * * * *